UNITED STATES PATENT OFFICE.

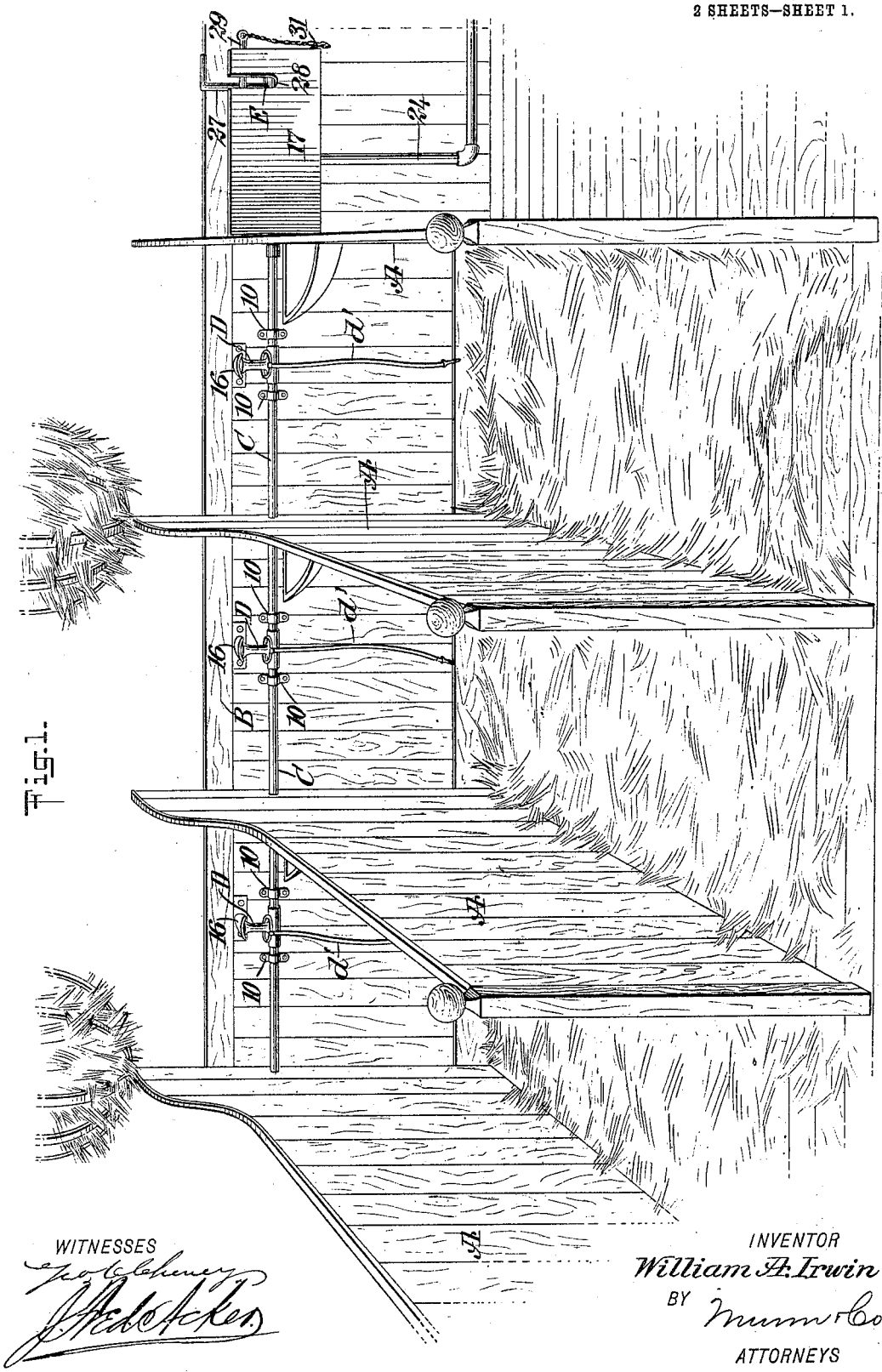

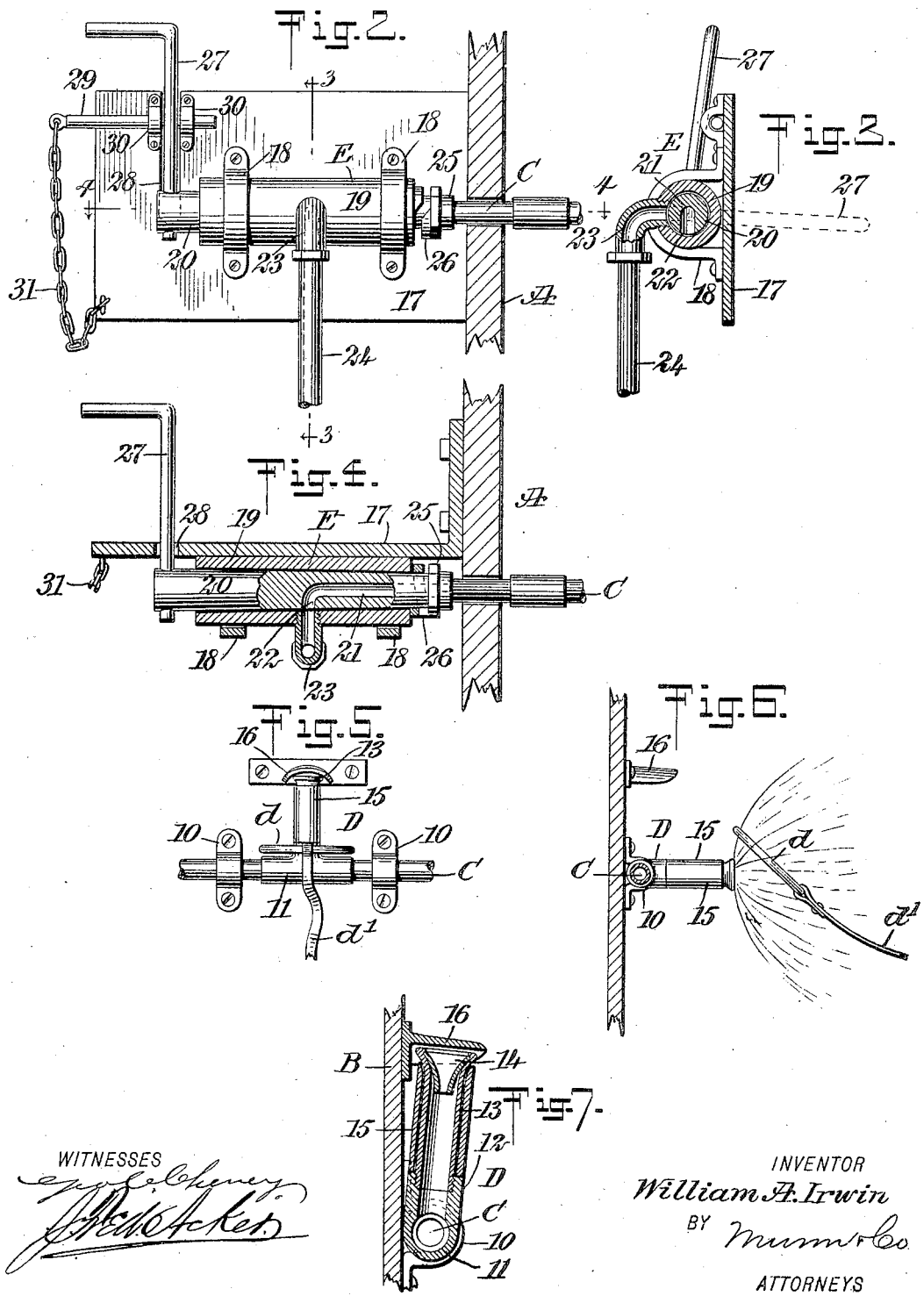

WILLIAM ARTHUR IRWIN, OF TAUNTON, MASSACHUSETTS.

ANIMAL-RELEASING DEVICE.

No. 828,660.  Specification of Letters Patent.  Patented Aug. 14, 1906.

Application filed March 22, 1906. Serial No. 307,423.

*To all whom it may concern:*

Be it known that I, WILLIAM ARTHUR IRWIN, a citizen of the United States, and a resident of Taunton, in the county of Bristol and State of Massachusetts, have invented a new and Improved Animal-Releasing Device, of which the following is a full, clear, and exact description.

The purpose of the invention is to provide a simple, economic, and effective device adapted for use in a stable or similar structure at the stalls, whereby in the event of fire to simultaneously release all the animals in a line of stalls and at the same time turn on an individual spray on each animal to force the animals to leave the stalls and the inclosure, the delivery mechanism for the spray being so arranged that in action the spray will reach the head and shoulders of each animal, whether standing or lying down. Another purpose of the invention is to provide a releasing device for animals which will normally serve to hold the hitching-staps in position for use, but wherein when the water is turned on the hitching-straps will be simultaneously released.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of a series of stalls and a front elevation of the improved releasing device applied. Fig. 2 is an enlarged rear elevation of the operating mechanism employed in connection with the spraying devices. Fig. 3 is a vertical section taken practically on the line 3 3 of Fig. 2. Fig. 4 is a horizontal section taken substantially on the line 4 4 of Fig. 2. Fig. 5 is a front elevation of the spraying-section of the device, the nozzle being in normal position. Fig. 6 is a sectional side elevation of the parts shown in Fig. 5, illustrating a nozzle in the act of throwing a spray, and it also represents a section taken through the support for the nozzle; and Fig. 7 is a vertical section through a nozzle and its support, drawn upon an enlarged scale.

A represents the partitions of stalls in a stable, and B the rear wall for said stalls. In each stall bearings 10 are secured to the rear wall B, preferably at each side of the center of the stall, and in these bearings a water-conducting pipe C is mounted to turn. This pipe extends through all of the stalls and out beyond the side of one of the outermost stalls, or the water-supply pipe C may be carried to the outside of the building, if so desired.

The horizontal member 11 of an inverted-T-shaped nozzle D is introduced into the water-conducting pipe C between the bearings 10 in each of the stalls, and the vertical or delivery member of the said nozzle D is peculiarly constructed, as is shown in Fig. 7. The lower portion 12 of this section is made very much thicker than the upper portion 13, and the lower portion 12 is interiorly threaded to receive a correspondingly-threaded portion of the upper section 13. Thus a space is provided between the outer face of the upper section 13 and the outer face of the lower or receiving section 12. The upper end of the upper section 13 is made more or less bell-shaped and receives a conical spray-tip 14, and a sleeve 15 is mounted to turn loosely around the upper section 13 of the vertical member of the nozzle. When the said nozzle is in its vertical or normal position, (shown in Figs. 5 and 7,) its outlet end is protected by a cover-bracket 16, also secured to the back wall B of the stall.

Wherever the receiving end of the pipe C is located a board 17 is secured—for example, to the outer face of the partition A of the outermost stall, as shown best in Fig. 4. On the rear face of this board or support 17 strap-bearings 18 are secured, and the said strap-bearings support a valve E. This valve consists of a cylindrical casing 19 and a plug 20, which is mounted to turn in the customary manner in the casing. The plug 20 has a channel 21, which extends from its inner end to a point near its center and connects with a port 22 in the outer face of the plug. The casing 19 is provided with an opening coinciding with the port 22 in the plug, and into this opening in the casing a fitting 23 is secured, usually an elbow, as is illustrated in Fig. 2. This fitting 23 is connected with a water-supply pipe 24.

The inner or channeled end of the plug 20 is attached to the receiving end of the water-conducting pipe C in any approved manner—as, for example, through the medium of a union or a nut 25—and the plug 20 of the valve is held to its work in the casing 19 by means of a spring 26, interposed between the said nut or union 25 and the opposing end of the casing 19, as is best shown in Fig. 2. The plug 20 of the valve is turned to turn the pipe C through the medium of a handle 27, secured in any desired manner to the outer end of the said plug 20, and this handle is preferably carried up beyond the upper edge of the board 17 and is opposite an opening 28 in said board, so that in operating the valve E and the pipe C the handle can be drawn toward the operator when standing in front of the board, as is clearly demonstrated in Fig. 1.

The normal position of the nozzle D is a vertical position, as is shown by Figs. 1, 5, and 7, and the operative or working position of the nozzle is a horizontal position, as is shown in Fig. 6. When the nozzles are brought to the horizontal position shown in Fig. 6, the port 22 in the plug of the valve is brought into registry with the supply-pipe 24, connected with the valve-casing 19, as is shown in Fig. 4.

The nozzles D are to be locked in their normal or upright position, and this may be accomplished in any desired manner. Usually, however, it is effected by sliding a bolt 29 at the back of the handle 27, said bolt being passed through bearings 30 at each side of the slot 28 in the board 17, and when the bolt 29 is in this position the handle 27 cannot be drawn toward the operator for the purpose of opening the valve to the water-supply. The bolt 29 is ordinarily connected with the board or support 17 by means of a chain 31.

The ring $d$, connected with a hitching-strap $d'$, is slipped over each of the nozzles D before said nozzles are carried to their vertical positions and are locked in such positions. Thus the animals may be secured in their stalls by the hitching-straps, the nozzles serving as supports for the same, and the sleeve 15 loosely mounted on each nozzle prevents the rings $d$ of the hitching-straps from wearing away the nozzles proper.

In operation, the parts being in their normal position and it is desired to release the animals tethered to the device and drive them from the stalls, it is simply necessary to remove the bolt 29 and draw the handle 27 downward, whereupon the water is turned on through the valve E into the conducting-pipe C and the nozzles D are simultaneously brought down to the horizontal position shown in Fig. 6, and the spray leaves each nozzle, striking the animals facing said nozzles on the heads and shoulders whether said animals are standing or lying down. The animals, frightened by the shock, will seek to leave the stalls, and in this effort will draw the rings of the hitching-straps off the nozzles, leaving the animals perfectly free to make their exit.

Having thus described my invention, I claim as new and desire to secure by Letters Patent—

1. In an animal-releasing device, a water-conducting pipe mounted to rock, a nozzle connected with the water-conducting pipe, a valve-casing connected with a water-supply pipe, a plug mounted to turn in said casing and connected with the water-conducting pipe to turn the same, and also to feed water thereto, and a hitching device removably mounted on the said nozzle.

2. In an animal-releasing device, a water-distributing pipe, supports in which the said pipe turns, a nozzle extending from the said pipe, a valve comprising a casing connected with a source of water-supply, and a plug mounted to turn in said casing and secured to the distributing-pipe, whereby to rock the said pipe in its support and feed water thereto, the said valve being closed when the nozzle is upright and opened when the nozzle is in a substantially horizontal position, and means for locking the valve in its closed position.

3. In an animal-releasing device, a water-distributing pipe, supports in which the said pipe is mounted to turn, a nozzle connected with the said pipe, a valve provided with a plug secured to said pipe to turn the pipe when the plug is turned, said valve being connected with a source of water-supply, the valve being open when the nozzle is in a lower position and closed when the nozzle is in an upper position, means for turning the plug of the valve, and a locking device for said means.

4. In an animal-releasing device, a water-distributing pipe, supports in which the pipe is mounted to turn, a nozzle connected with said pipe, having a spray-tip, a hitching-ring removably mounted on the nozzle, a valve having a plug connected with one end of said pipe, the said valve being connected with a source of water-supply, the valve being closed when the nozzle is upright and open when the nozzle is in a lower position, means for locking the valve when the nozzle is upright, and a sleeve loosely mounted on the nozzle with which the said ring engages.

5. The combination, with a stall and a water-distributing pipe mounted to turn in bearings on a wall of the stall, a nozzle secured to said pipe within the stall, a spray-tip for the nozzle, and a sleeve loosely mounted around the nozzle, of a cover-bracket for the nozzle when in an upright position, a valve, the plug of which is connected to and communicates with the said pipe, said valve being connected with a source of water-supply, a handle for the plug, a locking device for the handle, the valve being open when the nozzle is in a substantially horizontal position and closed when the nozzle is in an upright position, and a hitching-ring removably carried by the said nozzle.

In testimony whereof I have signed my name to this specification in the presence of two subscribing witnesses.

WILLIAM ARTHUR IRWIN.

Witnesses:
 JOHN J. CARROLL,
 KIERAN HORAN.